W. J. TURNER.
STALK CUTTING ATTACHMENT FOR PLOWS.
APPLICATION FILED APR. 27, 1912.
1,067,082.
Patented July 8, 1913.
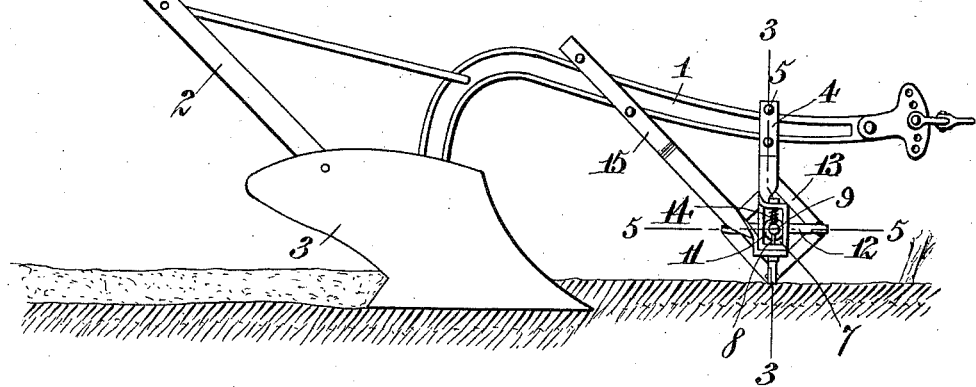
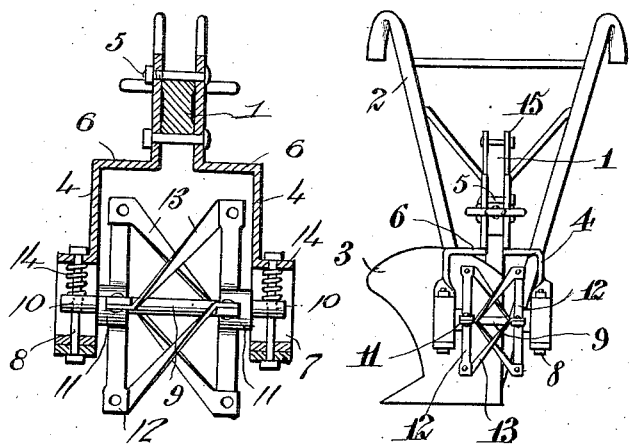
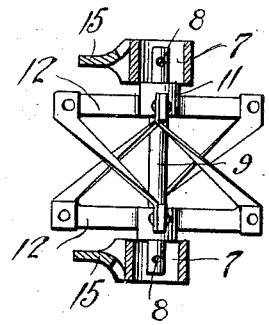
Inventor,
William J. Turner.
By Victor J. Evans,
Attorney.

UNITED STATES PATENT OFFICE.

WILLIAM J. TURNER, OF SNYDER, TEXAS.

STALK-CUTTING ATTACHMENT FOR PLOWS.

1,067,082.   Specification of Letters Patent.   Patented July 8, 1913.

Application filed April 27, 1912. Serial No. 693,660.

*To all whom it may concern:*

Be it known that I, WILLIAM J. TURNER, a citizen of the United States, residing at Snyder, in the county of Scurry and State of Texas, have invented new and useful Improvements in Stalk-Cutting Attachments for Plows, of which the following is a specification.

This invention relates to stalk cutting devices, and the particular object of the invention is to produce a simple and improved stalk cutter which may be readily attached to and used in connection with a plow such as a middle buster or a breaking plow of any approved type or pattern, whether the same be used as a walking or as a sulky plow.

A further object of the invention is to produce a simple and improved stalk cutting device of the character described which will be supported yieldably and which will be spring actuated in a downward direction so as to exert a distinct and effective cutting action on stalks lying on the ground with the result of chopping such stalks into small pieces which will be readily plowed under by the action of the plow.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation showing a plow to which the improved stalk cutting attachment has been applied. Fig. 2 is a front view of the same. Fig. 3 is a vertical transverse sectional view taken on the line 3—3 in Fig. 1. Fig. 4 is a sectional detail view taken on the line 5—5 in Fig. 1.

Corresponding parts in the several figures are denoted by like characters of reference.

The plow beam 1 is provided at its rear end with a standard 2 carrying a plow 3 which, as previously stated, may be of any suitable and preferred type or construction.

The frame of the stalk cutting attachment is composed of two side members 4, 4 which are mounted on opposite sides of the plow beam where they may be secured by means of clamping bolts 5 or in any other convenient manner. The side members 4 are provided with outwardly extending offsets 6, whereby the lower ends of said side members are suitably spaced apart, said lower ends being quarter-twisted and bent to form slots 7, the upper and lower ends of which are connected by bolts 8.

9 represents a shaft or axle, the ends of which are provided with apertures 10 engaging the bolts 8 on which the said shaft or axle is thus supported for vertically slidable movement. The shaft 9 is provided with spiders, each consisting of a hub 11 having radial arms 12. Bolted or otherwise securely supported on the arms 12 are spirally disposed cutting blades 13 which, by engagement with the ground, cause the spiders to rotate on the shaft when the device is in operation, thereby causing the stalks that lie on the ground to be cut or chopped into small pieces as the machine advances over the ground. Springs 14 are coiled on the bolts 11 above the ends of the shaft 9, which latter is thereby cushioned and forced in a downward direction.

The ends of the bolts 8 which project through the lower ends of the side members 4 serve for the attachment of the lower ends of the forwardly extending inclined braces 15, the upper extremities of which are bolted, clamped or otherwise suitably secured on the plow beam. These braces not only reinforce the construction of the device, but they also serve to cause the weight of the rear end of the plow beam and the plow to be thrown upon the stalk chopping device, thereby forcing the latter in a ground engaging direction.

The operation and advantages of this invention will be readily understood from the foregoing description when taken in connection with the drawings hereto annexed. The construction of the improved device is very simple and effective, and the said device may be readily applied to the beams of either walking or sulky plows. A plow equipped with the improved stalk cutting device may be operated with little, if any, increase in the draft, and the stalks chopped by the device will be immediately plowed under, thereby enriching the soil. The device being applied to and operated in connection with a plow is obviously of a labor-saving nature, since it performs at one operation the work of chopping the stalks remaining from a previous crop and plowing the stalks under to prepare the land for a new crop which heretofore has been usually done by a separate operation.

Having thus described the invention, what is claimed as new, is:—

In a stalk cutting attachment for plows, the combination with a plow beam, of a frame including side members clamped on said beam and having outwardly offset portions bent to form slots at their lower ends, bolts extending vertically through the slotted portions of the side members, a shaft having apertured ends guided on the bolts, cutter carrying members supported for rotation on the shaft, and inclined brace members connected at their lower forward ends with the lower ends of the bolts extending through the slotted portions of the frame members, the upper rear ends of said brace members being connected with the plow beam.

In testimony whereof I affix my signature in presence of two witnesses.

WILLIAM J. TURNER.

Witnesses:
O. R. THRANE,
J. T. BIGGS.

---

Copies of this patent may be obtained for five cents each, by addressing the "Commissioner of Patents, Washington, D. C."